United States Patent [19]
Thompson

[11] Patent Number: 5,707,661
[45] Date of Patent: Jan. 13, 1998

[54] FORMING CUP FOR TORROID FORMING MACHINE

[75] Inventor: Stephen M. Thompson, Los Angeles, Calif.

[73] Assignee: Thompson Bagel Machine, L.A., Calif.

[21] Appl. No.: 528,703

[22] Filed: Sep. 15, 1995

[51] Int. Cl.$^6$ .................................................. A21C 1/14
[52] U.S. Cl. .................. 425/442; 249/115; 249/134; 249/135; 249/170; 249/171
[58] Field of Search .................. 425/442; 249/115, 249/134, 135, 170, 171

[56] References Cited

U.S. PATENT DOCUMENTS

3,727,875   4/1973  Downing .............................. 249/115

*Primary Examiner*—Thomas R. Weber
*Attorney, Agent, or Firm*—Oppenheimer Poms Smith

[57] ABSTRACT

A composite torroid forming cup for an automated torroid-forming apparatus has a molded plastic upper closure and a bottom reinforced cup section. The upper closure has a hinge pin and an upper non-stick partial torroid forming surface. The bottom reinforced cup section has a substantially rigid reinforcing subframe and a plastic outer body portion that may be molded about the subframe. The bottom reinforced cup section has a bottom non-stick, partial torroid-forming surface. A method of making a composite dough torroid forming cup has several steps. A flat reinforcing plate is perforated with a plurality of apertures, and studs are spot-welded in a spaced relation onto the reinforcing plate. The reinforcing plate is positioned on a forming die and is formed thereon. The reinforcing plate is positioned in a mold, and plastic is molded about the reinforcing plate to form a reinforced bottom cup section. Plastic closures are formed in a closure mold, and are hingedly mounted on the reinforced bottom cup section to make a full dough forming cup. A shape-retaining core is provided within the cup to maintain the cup tightly fitting about the core. The cup is immersed in chilled water for cooling purposes.

22 Claims, 6 Drawing Sheets

FORMING CUP FOR TORROID FORMING MACHINE

BACKGROUND OF THE INVENTION

1. Field of the Invention

This invention relates to forming cups used in machines for forming torroids from dough, particularly composite plastic and metal forming cups.

2. Description of the Related Art

Various machines have been devised for the purpose of automatically forming dough into torroids, and particularly for forming bagels. An efficient apparatus for forming dough torroids may employ a stationary mandrel and many forming cups each having a bottom cup base and two hinged side parts. The bottom cup bases may be attached to a moving conveyor chain. Each cup initially passes immediately underneath the stationary mandrel with the side parts spread open, allowing for dough to be deposited into the cup. The hinged side parts are then closed by guides running adjacent to the mandrel. The moving cups roll the dough around the mandrel, and the dough forms a torroid between the mandrel and the closed, substantially cylindrical torroid forming surface of the closed cup. This type of machine is described in the Daniel T. Thompson U.S. Pat. No. 4,368,019, which is incorporated herein by this reference.

An alternative machine employs two separate conveyors of forming cups. Each conveyor carries half-cylindrical forming cups, passing them along-side the stationary mandrel. The half-cylindrical cups mate to form a single cylinder around the mandrel. Machines involving half-cups are depicted in Daniel T. Thompson U.S. Pat. No. 4,147,809 (FIG. 4) and also in Reiter, et al. U.S. Pat. No. 3,379,142.

To date, the most successful forming cups have been made of solid metallic materials. Bagel dough in particular is heavy and stiff, and considerable forces are exerted on the forming cup as dough is rolled between the mandrel and the forming cup. Wear and tear is particularly acute during high volume production, and forming cups must be able to withstand high stresses at high production rates for long periods between repair or replacement. Consequently, the cups must be made of a strong and rigid material. Thus far, only solid metal has provided the durability needed for a high volume, long-lived torroid forming cup.

Metal forming cups, however, have limitations. Metal is a poor contact surface for bagel dough because the dough tends to stick to the metal. Indeed, the forming cups must be coated or sealed with a thin layer of a non-stick material to prevent the dough from adhering to the surface of the cup. However, such a coating eventually wears out and the dough begins to stick to the cup. The cups must then be removed from the machine for sandblasting and recoating. This process can be expensive and slow, resulting in substantial maintenance costs.

In view of the limitations of the prior art, I have determined that there is a present need for a durable torroid forming cup having a forming surface that is made from a material that will not adhere to bagel dough. I have also determined that this cup should not require a surface coating, particularly a coating that is subject to wear.

SUMMARY OF THE INVENTION

It is therefore an object of the present invention to disclose and provide a torroid forming cup having a durable surface made from a material to which bagel dough, donut dough, biali dough and other doughs that can be formed into torroids will not stick. It is a further object to provide a torroid forming cup having a surface that will not peel after repeated use in a commercial dough-torroid forming environment. It is an additional object to provide a torroid forming cup that will retain the shape of its torroid forming surface over time.

Generally stated, a composite forming cup for an automated dough torroid-forming apparatus has at least one molded plastic closure having a first non-stick partial torroid forming surface. The cup also has a reinforced cup section having a substantially rigid subframe and a molded plastic body portion. The plastic body portion has a second non-stick partial torroid forming surface. The subframe provides structural stiffness to the reinforced cup section. The closure or closures are hingedly mounted to the reinforced cup section, and may be rotated from an open position for depositing dough inside the forming cup to a closed position in which a torroid may be formed.

The present invention overcomes the problems of the prior art in a number of ways. First, the plastic non-stick material provides a durable surface to which dough will not stick. Secondly, the plastic will not peel after repeated use in a commercial bagel-making environment. Additionally, the subframe helps retain the shape of the torroid forming surface over time.

Considering features that may be incorporated into various embodiments of the present invention, the subframe may be molded into the interior of the molded plastic body, or may alternatively be on an outer surface of the plastic body. The subframe may be made of a metal having a somewhat rough surface, so that the subframe and the plastic may bond well.

In a presently preferred embodiment, the forming cup has two closures, each of which being hingedly mounted onto the reinforced cup section. Each closure may include a metal hinge pin that is mounted onto the reinforced cup section, or the cup section may have one or more hinge pins onto which the closures mount.

The forming cup may have one or more mounting studs for mounting onto another portion of the automated torroid forming machine. Alternatively, the forming cup may have one or more femmale threaded members for the same purpose.

Considering one embodiment of the present invention in greater detail, a torroid forming cup has two plastic upper closures which each have a hinge pin and an upper torroid forming surface. A reinforced bottom cup section that has a metal interior subframe and a molded plastic outer body portion. The plastic outer body portion has a bottom torroid forming surface. The rigid interior subframe provides structural stiffness and durability to the bottom cup section, and maintains the shape of the bottom torroid forming surface as the plastic cools after molding.

The bottom cup section also includes molded ears into which the hinge pins are rotatably mounted, such that the upper closures may be rotated from an open position for depositing dough into the cup to a closed position for forming the torroid. In the closed position, the upper torroid forming surfaces and the bottom torroid forming surface are adjacent to one another to make a substantially cylindrical torroid forming surface.

The present invention may include various other features. The interior subframe may have two studs which protrude through the plastic outer body portion. The purpose of the studs is to provide a means to affix the forming cup to a conveyor or chain with attachment links. Each hinge pin retaining slot may include one or more hinge pin retaining buttons to allow the hinge pins to be snapped in and out of the slot. The subframe may include casting perforations to prevent the subframe from moving relative to the outer plastic body portion during the molding and to firmly embed the subframe into the outer plastic body portion.

Additionally, the upper and lower torroid forming surfaces may have spaced annular ridges to prevent slippage of the dough annulus within the cup during the torroid forming process. Alternatively, the forming surfaces may have fine annular striations for the same purpose. In other embodiments of the present invention, the forming surfaces may be smooth.

Generally speaking, a method of making a dough forming cup which has a perforated reinforcing plate embedded therein has several steps. The reinforcing plate is positioned in a mold. Plastic is formed in the mold about the reinforcing plate to form a reinforced torroid forming bottom cup section which has a dough torroid forming surface. Plastic closure pieces are formed in a closure piece mold. Each closure piece has a dough forming surface and a hinge pin. The plastic closure pieces are hingedly mounted onto the reinforced bottom cup piece to make a full dough forming cup. A shape-retaining core is provided within the cup to maintain the cup tightly about the core. The shape-retaining core may be one of a variety of inserts having a diameter to match the particular inner diameter of the cup. The cup is immersed in chilled water to cool the plastic to room temperature, thereby setting the shape of the dough forming surfaces.

Various other steps may also be incorporated into the method. The reinforcing plate may be perforated with a plurality of apertures. Studs may be spot welded in a spaced relationship onto the reinforcing plate to eventually mount the dough forming cup onto a moving portion of a torroid forming apparatus. After spot welding the studs, the reinforcing plate may be positioned on a forming die. The reinforcing plate may be formed on the die and removed therefrom. The reinforcing plate is then ready to be positioned in a mold.

In accordance with other aspects of the present method, the step of forming plastic closure pieces may further comprise positioning hinge pins in the closure piece mold. Plastic is formed about a portion of each of the hinge pins, with another portion of each of the hinge pins protruding from the plastic. The protruding portion of the hinge pin may then be hingedly mounted onto the bottom cup portion.

The step of positioning the reinforcing plate on a forming die may additionally include inserting the spot-welded studs into female die stud apertures in the forming die to hold and register the plate in place on the die. The step of forming the reinforcing plate in the die may include pushing a male forming head against the plate to plastically deform the plate into a curved shape. The reinforcing plate may have hubs along an edge thereof. The step of forming plastic in the mold about the reinforcing plate may include holding the hubs so that the reinforcing plate will not move relative to the plastic after the plastic has been formed about the reinforcing plate.

Additionally, the bottom cup portion may have ears which each have a hinge pin slot. The step of hingedly mounting the plastic closure pieces onto the cup base may include mounting the protruding portion of each of the hinge pins within a hinge pin slot prior to the step of immersing the cup into chilled water.

Other objects, features and advantages of the invention will become apparent from a consideration of the following detailed description and the accompanying drawings.

BRIEF DESCRIPTION OF THE DRAWINGS

FIG. 4 is a an end view of an embodiment of the present invention with a partial cut away revealing the subframe;

FIG. 5 is a side view of the cup of FIG. 4 with a partial cut away revealing the metal subframe and the dough retaining ridges on the dough forming surfaces;

DETAILED DESCRIPTION OF A PREFERRED EMBODIMENT

Figure 1:
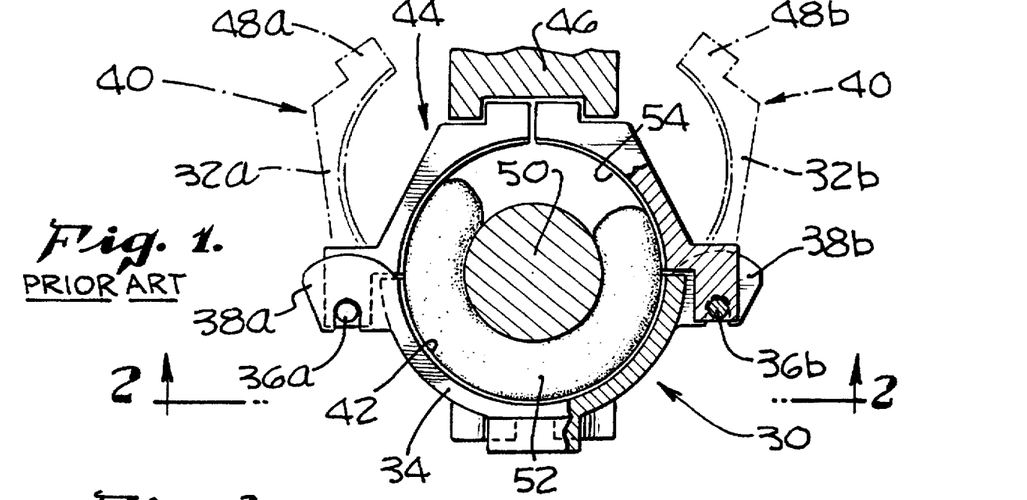
FIG. 1 is an end view of a prior art solid metal forming cup with a partial cut away revealing the solid metal body.
Figure 2:
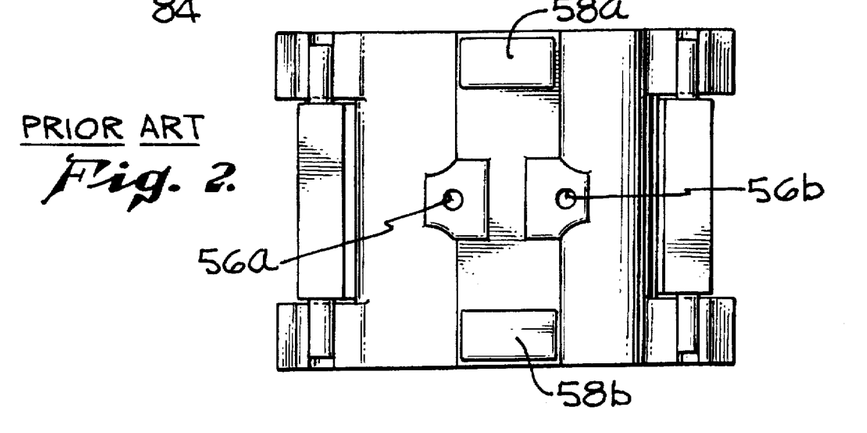
FIG. 2 is a bottom view of the prior art solid metal forming cup of FIG. 1.

Referring more particularly to the drawings, FIGS. 1 and 2 illustrate a heavy metallic forming cup 30 of the type found in the prior art. The forming cup includes quarter cylindrical closures 32a and 32b, and a semi-cylindrical bottom cup segment 34. Closures 32 include hinge pins 36a and 36b which engage in slots in ears 38a and 38b of cup base piece 34. Consequently, the closures 32a and 32b may rotate outwardly and inwardly during the torroid-forming process.

To form a torroid of dough, closures 32a and 32b begin in an open position 40, allowing machinery to deposit dough against the forming surface 42 of the cup base piece 34. Thereafter, the closures 32a and 32b are rotated into a closed position 44. Once in this closed position, the guide means 46 engage the guide tabs 48a and 48b to prevent the quarter cylindrical die segments 32a and 32b from rotating open. The mandrel 50 causes the dough 52 to take on a torroidal shape.

Throughout the torroid forming process, the heavy metallic forming cup 30 travels along a conveyer belt or link chain. Once the dough torroid is completely formed, the closures 32a and 32b open outwardly so that the dough torroid may be removed from the heavy metallic forming cup 30. The cup 30 is generally bolted to supporting ears which are interconnected with a link chain pin (not shown). The bottom of the cup 30 is provided with the threaded bolt holes 56a and 56b (FIG. 2) to accommodate mounting bolts. Metal feet 58a and 58b stabilize the cup 30 when it is mounted on the torroid forming apparatus.

As discussed above, this type of prior art forming cup is made entirely of metal. The forming surfaces 42 and 54 are typically provided with a coating in order to prevent the tacky dough from sticking to the forming surfaces. The coating on the forming surfaces eventually wears out and the forming cup must be sand blasted and recoated at considerable expense.

Figures 6, 24:
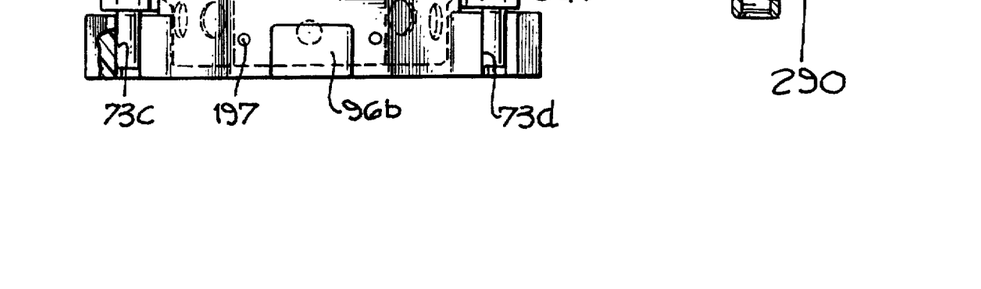
FIG. 6 is a bottom view of the mounting surface of the cup of FIG. 4 with a partial cut away revealing the perforated subframe.
FIG. 24 illustrates an alternative embodiment in which a female threaded member is molded into the plastic body for engagement with a mounting bolt.

In contrast to the heavy metallic prior art structure of FIG. 1, the present invention is a composite plastic and metal structure having hard plastic surfaces to which bagel dough will not stick. FIG. 4 shows an embodiment of the present invention having molded plastic upper closures 64a and 64b, which are structurally identical members mounted opposite one another in a symmetrical relationship. The upper closures have corresponding regions 65a,b where the thickness of the plastic is somewhat reduced in order to prevent deformation of the shape of the closures as the plastic shrinks during cooling. FIG. 5 shows the reduced thickness area 65a on one side of the forming cup. The opposite side of the forming cup is a mirror image of FIG. 5 and includes another reduced thickness area 65b (not shown). The metallic hinge pins 66a and 66b are molded into the hinge pin-carrying portions 68a and 68b of the plastic closure segments 64a and 64b, as FIG. 6 illustrates.

Figures 17, 18:
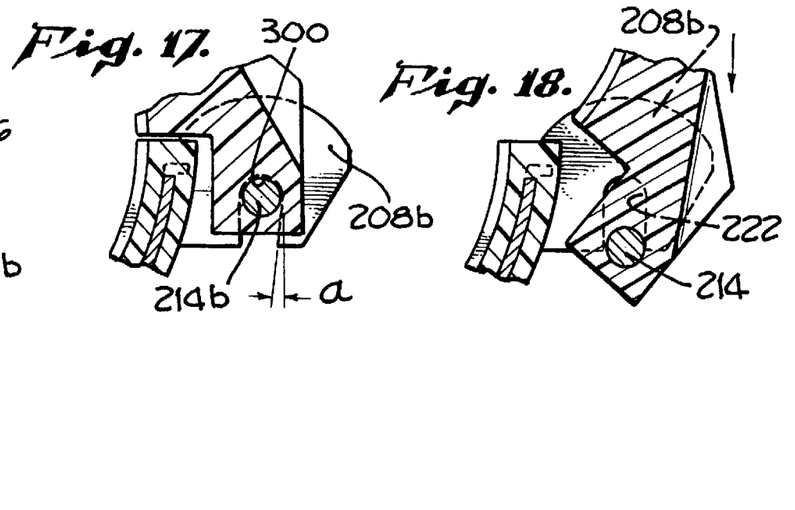
FIG. 17 is a detail view showing the pivot pin of a closure piece snugly secured within a hinge pin slot of a forming cup.
FIG. 18 is a detail view showing the pivot pin of FIG. 17 being snapped out of the hinge pin slot of a forming cup.

Exposed hinge pin ends 70a and 70b fit into plastic hinge pin retaining slots 72a and 72b of bottom cup ears 102a and 102b. FIG. 17 shows that the ears have slot walls, which are typically parallel to one another where the hinge pins are mounted. Plastic retaining buttons 73a–d protrude from a slot wall into the slot to retain the hinge pin in the slot.

Figure 3:
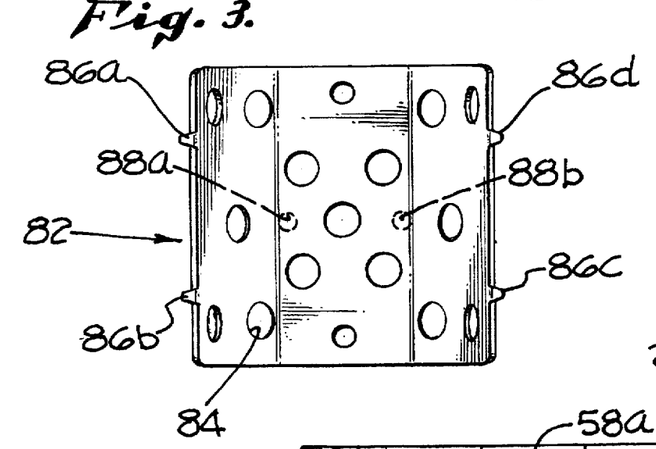
FIG. 3 is a plan view of the subframe of an embodiment of the present invention.

Returning to FIG. 4, the reinforced bottom cup section 74 includes a plastic body portion 76 having a plastic forming surface 78 and a plastic outer surface 80. Plastic body portion 76 is reinforced with a metal reinforcing subframe 82. FIG. 3 illustrates the metal subframe 82 in more detail. In addition to structurally reinforcing the plastic, the subframe maintains the shape of the bottom torroid forming surface as the plastic cools after molding.

The subframe 82 includes apertures 84, also known as perforations, into which plastic flows during the molding process. Once the plastic sets, the plastic in the perforations firmly embeds subframe 82 into the outer plastic body portion 76. The subframe is thereby prevented from moving relative to the plastic body portion 76. Nubs 86a, b, c, and d provide a means to hold the subframe in place during the molding process. The hubs 86a–d may rest against the walls of the mold to hold the subframe in place as the plastic is injected into the mold and as the plastic cools.

FIG. 3 also illustrates two studs 88a and 88b which protrude downwardly from metallic subframe 82. FIG. 4 shows these studs 88a and 88b from the side. The studs may connect to the supporting ears 90a and 90b of link chain pin 92, which is part of a chain drive which carries the forming cup 63 along the torroid-forming production line.

As with the prior art, the present forming cup 63 may have various features for interconnecting the cup with the torroid forming machinery, as necessary. For example, the plastic closure tabs 94a and 94b correspond to the metallic closure tabs 48a and 48b in the prior art that FIG. 1 illustrates. Plastic stabilizing feet 96a and 96b (FIG. 6) may also be provided to stabilize the forming cup and to reduce vibration when the forming cup is mounted on a conveyor for automated torroid-forming. The forming cup 63 may also have a variety of other types of molded features for mounting the cup onto various models of torroid-making machinery.

FIG. 5 illustrates assorted other features of a preferred embodiment of the present invention. FIG. 5 is a side view which, in conjunction with FIG. 6, shows the hinge pin-carrying portions 68a and 68b of plastic closures 64a and 64b. A cross-hatched area illustrates the metal subframe 82 within reinforced bottom cup section 74. The studs 88a and 88b extend from the metallic subframe 82 through the plastic body portion 76 for interconnection with support ears 90 (FIG. 4).

Returning to FIG. 4, the non-stick plastic forming surfaces 78, 79a and 79b include spaced ridges 98 for holding the dough from slipping within the forming cup 63 during the torroid-forming process. The spacing of ridges 98 may be designed fairy closely together for more friction, or the ridges 98 may be farther apart for less friction.

As an optional additional feature, the slight elastic property of the plastic hinge pin retaining walls which define slots 72a and 72b may snugly retain the end portions 70a and 70b of the hinge pins, causing rotational friction between the end portions of the hinge pin and the hinge socket. This friction dampens rotation of the closures 64a and 64b.

Figure 23:
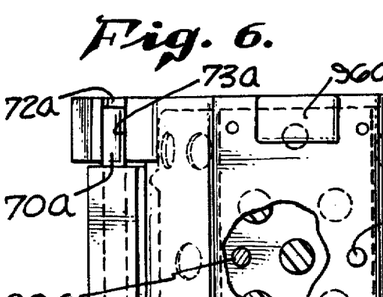
FIG. 23 is a sectional view of an alternative embodiment of the present invention having a subframe without the upturned side portions of the subframe of FIG. 4.

FIG. 23 illustrates an alternative embodiment of a reinforcing subframe 286 having no upturned side portions. The subframe of FIG. 23 provides the torroid forming cup with means for mounting the cup onto a moving portion of the automated torroid forming machine, but provides no reinforcement to the sides of the bottom portion of the cup.

FIG. 24 illustrates another alternative embodiment in which one or more threaded molded insert 290 are embedded into the bottom plastic cup section. Each threaded molded insert receives a machine screw or bolt to mount the cup onto a moving portion of the automated torroid forming machine. The threaded molded insert may be tapered so as to lock the screw or bolt into the threads of the threaded molded insert when the screw or bolt is pulled downwardly away from the cup. As an alternative to threaded molded inserts, the subframe itself may be provided with threads to receive a screw or bolt.

Concerning the material composition of the plastic which is used to mold the closures 64a and 64b and the plastic portion of bottom cup 74, the inventor presently prefers Acetal Resin, Delrin 100 Natural grade, which are available from DuPont. Delfin 500 or Delfin 900 grade may also be used. A wide variety of alternative plastics may be employed, such as the following which are available from DuPont and other manufacturers: ABS, acetal resins, homopolymers and copolymers, acrylics, fluoro plastics, polyamide/nylon resins, polycarbonates, and polyester resins (PBT, PET and PETG). Other materials that may be used include polyetherether ketones, polyetherinides, polyethylene and ethylene copolymers. Polyurethanes, polystyrenes, silicones, thermoplastic elastomers, and vinyl polymers and copolymers may also be used. High density polyethylene may be used for particularly thick forming cups.

The metal components of the preferred embodiment, such as the reinforcing subframe, the studs, and the hinge pins, should be made of stainless steel to meet FDA requirements. 304 Stainless Steel is presently preferred, although other stainless steels may be employed. A stainless steel subframe may be sandblasted with 80 grit aluminum oxide to improve adherence of the plastic to the subframe. The subframe should be free of grease, particles and the like that would reduce the adherence of the subframe to the plastic.

Concerning dimensions, the following dimensions are offered for purposes of illustration but not of limitation. The torroid forming cup may be approximately 3⅝" long with a substantially cylindrical torroid forming surface having an inner diameter of approximately 2¾". The hinge pins may be cylindrical with a diameter of ¼". The hinge pins may be 3½" long with the ends which protrude from the plastic closures and engage in the hinge pin retaining slots each being ⅝" long. The torroid retaining ridges may be spaced approximately ½" from an adjoining ridge or ridges. Of course, the cup may be larger or smaller depending on the size of torroid to be formed.

Method of Manufacturing the Improved Forming Cup

Those skilled in the art may manufacture a preferred embodiment of the present invention by implementing the following preferred method of manufacture.

Figures 7, 8, 11:
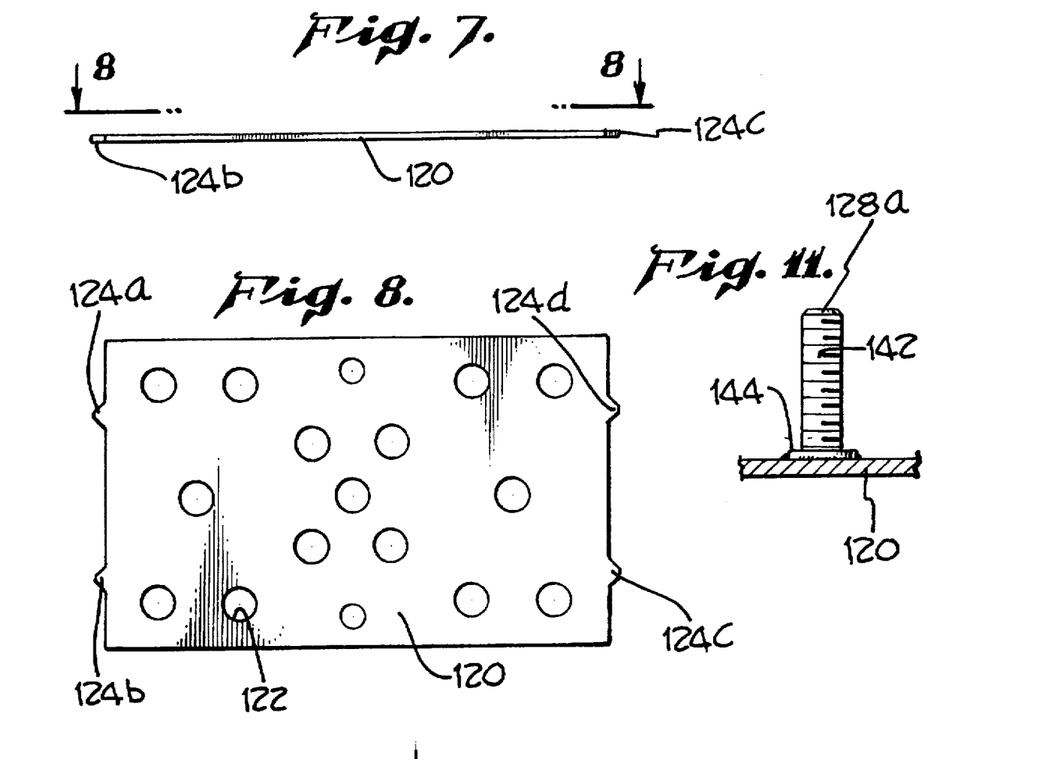
FIG. 7 is a side view of a flat perforated metal plate prior to forming into a subframe.
FIG. 8 is a top view of the flat perforated metal plate of FIG. 7.
FIG. 11 is an elevational detail view taken along line 11—11 of FIG. 10 of a stud as welded onto the metal plate.

The manufacturer begins with a flat metallic plate such as that shown in FIGS. 7 and 8. The plate 120 should include a plurality of apertures 122, also known as perforations. These apertures 122 may be punched from a flat plate with a commercial metal punch. Specific methods of perforating metal plates are well known in the art and need not be explained further here. Plate 120 should also include nubs 124a, b, c, and d which are used later on in the manufacturing process to hold the plate 120 in place relative to the heated plastic.

Figure 9:
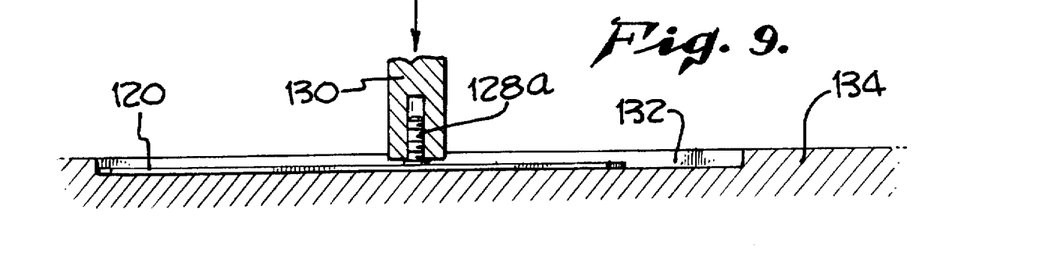
FIG. 9 is a sectional elevation view of a first stud being spot welded onto the metal subframe.
Figure 10:
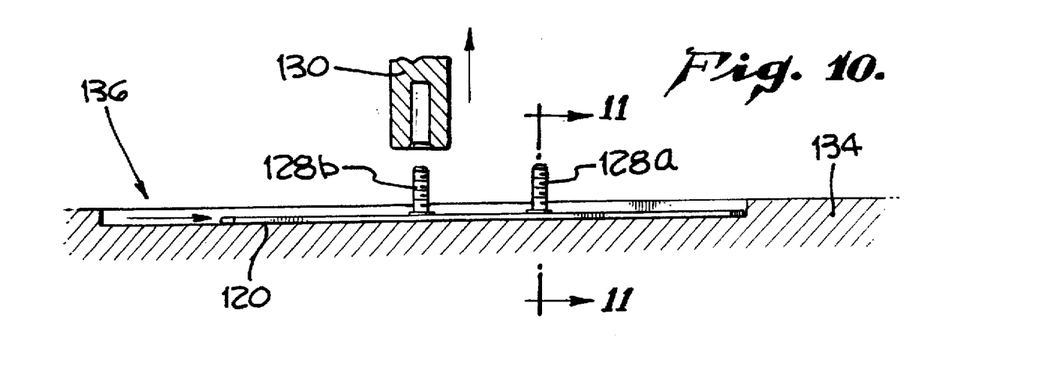
FIG. 10 is a sectional elevation view of the metal plate after a second stud has been spot welded onto the metal subframe.

The first important step in manufacturing a preferred embodiment of the present invention is to attach first and second studs 128a and 128b to one side of the plate 120, such as that seen in FIG. 10. FIG. 9 shows a plate 120 laying in a plate-holding slot 132 of jig 134. A fast stud 128a is shown being spot welded onto plate 120 by spot welder head 130. After the first stud 128a has been welded onto plate 120, the manufacturer slides plate 120 forward in plate-holding slot 132, as seen in FIG. 10, in which plate 120 has been slid forward to a second position 136. Spot welder head 130 is lowered onto a second stud 128b to weld the stud 128b onto the plate 120. For clarity, FIG. 11 shows a detail view of the first stud 128a. The stud 128a includes threads 142 and a stud base 144 for welding onto plate 120. This first step produces a perforated flat plate having two studs welded onto one side of the plate.

Figure 12:
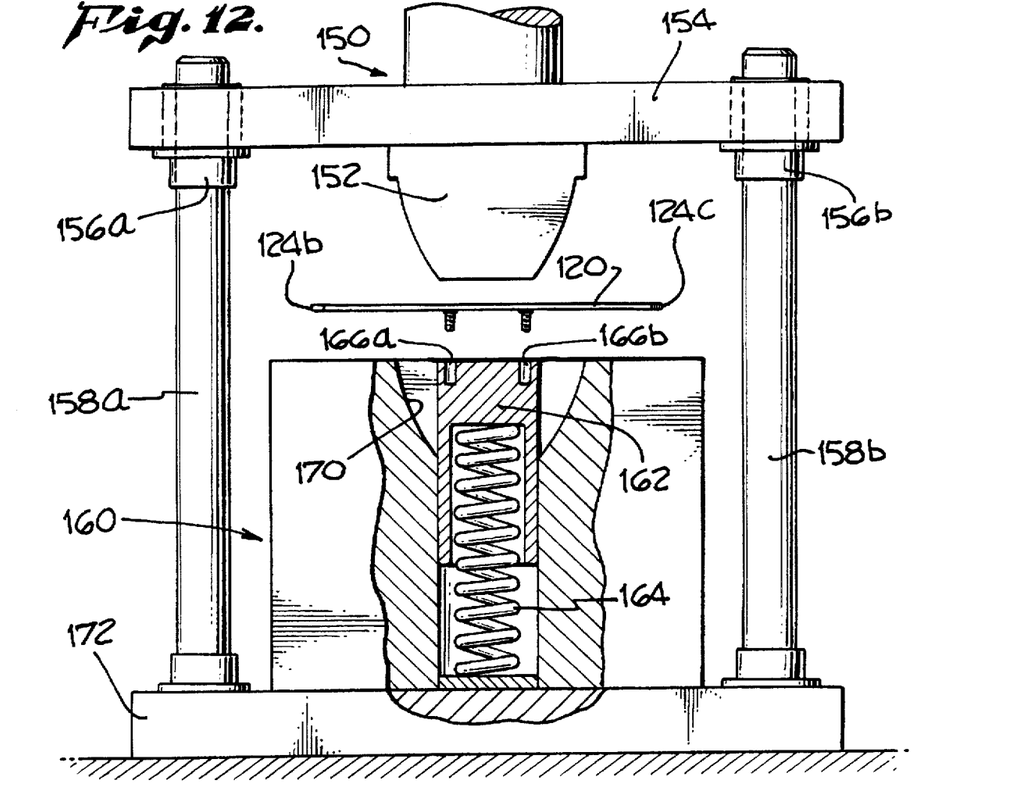
FIG. 12 is a perspective view and partial sectional view of a forming press, a die and a flat perforated metal plate prior to forming.
Figure 13:
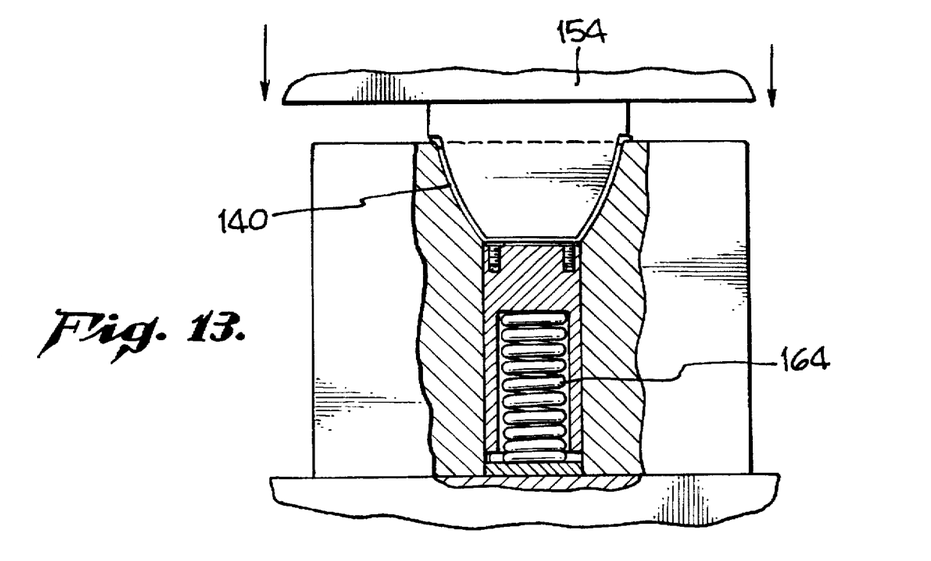
FIG. 13 is a detail perspective view of the components of FIG. 12 with the forming press in its fully lowered position and the plate having been formed into a subframe.

The second important step is to form the flat plate 120, as seen in FIG. 12, into a formed reinforcing plate 140, which is seen in FIG. 13. This step is accomplished with the help of a forming press 150, which has a forming head 152. Forming head 152 travels up and down vertically in conjunction with moving plate 154, which has bearings 156a and 156b that slide vertically along alignment posts 158a and 158b. Table 172 serves as a base for alignment posts 158a and 158b. A forming die 160 is used in conjunction with forming press 150. The die 160 includes a spring-loaded aligning bar 162 having female die apertures to accommodate fast and second plate studs 128a and 128b. Spring-loaded aligning bar 162 rests atop a coil spring 164, which resists downward motion of the spring-loaded aligning bar 162. Die 160 also includes a female die surface 170 having a profile which is desired for the upwardly curving arms of the formed reinforcing plate 140 and which mates with the forming head 152.

To form the plate 120 into the reinforcing plate 140, the studs 128a and 128b of plate 120 are first inserted into female die apertures 166a and 166b of spring-loaded aligning bar 162. Moving plate 154 and forming head 152 are then lowered onto flat plate 120, as seen in FIG. 13. The forming head 152 then plastically deforms flat plate 120 into a generally concave shape which is appropriate for use as a structural support for a torroid forming cup having a semi-cylindrical inner torroid forming surface. As FIG. 13 illustrates, the spring-loaded aligning bar 162 displaces downwardly in response to the downward motion of the forming head 152.

The third important manufacturing step is to mold a bottom torroid cup section and its two accompanying closures. The bottom torroid cup is a composite plastic and metal structure in which the reinforcing structure 140 is enveloped by an outer plastic body portion which is molded to a desired shape. The closures are also composite plastic and metal structures having a predominantly molded plastic body portion with a metal hinge pin molded into one end thereof.

Figure 14:
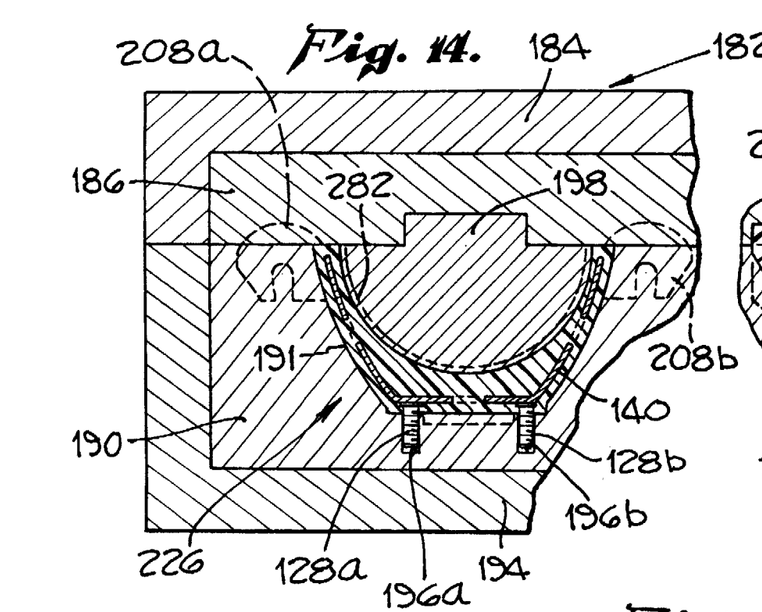
FIG. 14 is a sectional view of the bottom and top cup molds, the inner cup core and a molded plastic body about the metal subframe.
Figure 15:
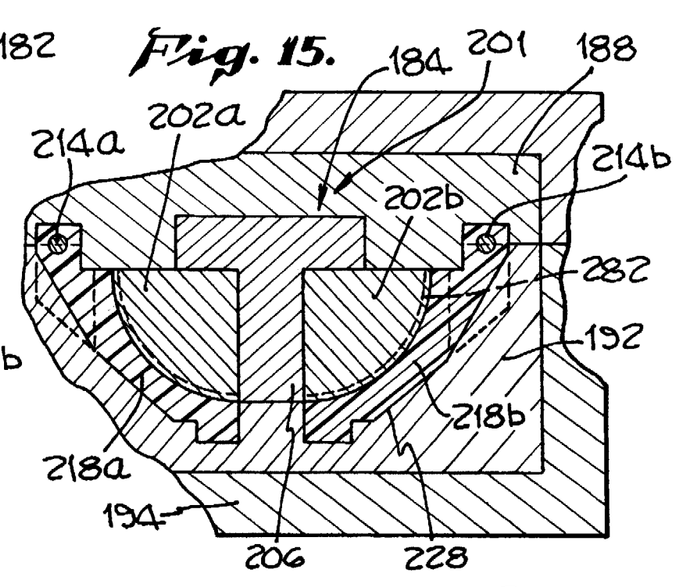
FIG. 15 is a sectional view of the bottom and top closure molds, the inner closure core and the molded plastic closures with hinge pins.

FIGS. 14 and 15 illustrate a mold assembly 182 for molding a bottom cup section 226 and first and second closures 218a and 218b. Mold 182 includes a top mold plate 184, a bottom mold plate 194, a top cup mold 186, a bottom cup mold 190, a top closure mold 188, and a bottom closure mold 192. FIG. 14 shows the portion of the mold assembly which is used to mold bottom cup 226. Bottom cup mold portion 190 includes a cavity 191 having a profile which defines the exterior surface of the cup 226. Formed reinforcing structure 140 is placed in cavity 191, with first and second studs 128a and 128b being inserted into stud receiving holes 196a and 196b. Small posts (not shown) extend upwardly from the bottom cup mold to support the reinforcing structure 140 at a distance of approximately ⅛" above the bottom of the mold, to allow plastic to flow beneath the reinforcing structure. The posts may leave indentations 197 in the finished cup (FIG. 6).

A cup inner core 198 is placed in between top cup mold 186 and formed reinforcing structure 140. The outer profile of inner cup core 198, which is shown as a semi-cylindrical profile in FIG. 14, defines the torroid forming surface of bottom cup section 226. Top cup mold 186 and bottom cup mold 190 also include cavities for forming first and second ears 208a and 208b of bottom cup 226. First and second ears 208a and 208b include hinge pin slots 72a and 72b (FIG. 14).

Bottom closure mold portion 192 includes closure cavity 228, which provides the space necessary to mold first and second closures 218a and 218b. A portion of closure cavity 228 defines the outer profile of closures 218a and 218b. Inner closure core 201 includes a portion 202a for defining the torroid forming surface of the first closure 218a and an inner core 202b for defining the torroid forming-surface of second closure 218b. Inner cores 202a and 202b are separated by a spacer 206 which provides some distance in between the first and second closures 218a and 218b within the mold. First and second hinge pins 214a and 214b are held within bottom closure mold portion 192 by way of clips which are not illustrated. During molding, plastic flows around and envelops a portion of each of first and second hinge pins 214a and 214b.

Once all of the components of cup mold 182 are put into their proper position, a manufacturer may input hot plastic into the mold through pore ports which are standard in the art and which are not shown in the drawings. The plastic flows into cavity 191 and envelops the formed reinforcing structure 140, with the exception of studs 128a and 128b. The plastic also flows into and fills closure cavity 228 to create the first and second closures 218a and 218b, which are structurally identical to one another.

Figure 16:
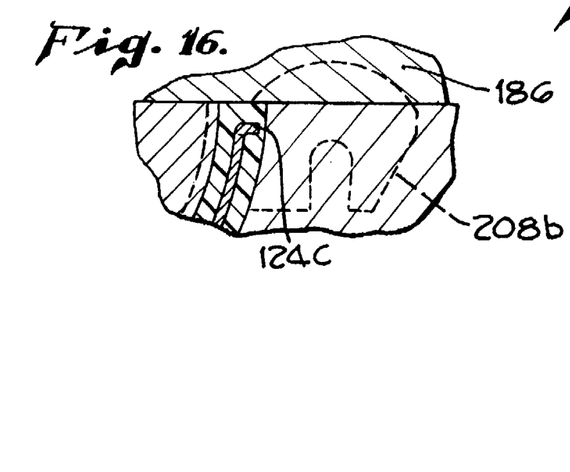
FIG. 16 is a detail view of FIG. 14 showing a nub of the metal subframe against the wall of the mold.

FIG. 16 is a detail view of the right hand side of bottom cup section 226 of FIG. 14. Of particular interest is hub 124c, which is one of the four nubs 124a–d. These nubs help prevent the structure 140 from moving relative to the hot plastic that envelopes the structure 140.

Once bottom cup section 226 and first and second closures 218a and 218b have been formed and the plastic allowed to set, the molds are disassembled and the cup components removed. Closure pieces 218a and 218b are then hingedly attached to bottom cup section 226. This hinged attachment is accomplished by positioning the hinge pin ends within their respective bottom cup hinge pin slots on the bottom cup ears 208a and 208b. Thus, FIG. 17 shows that the end portion of second hinge pin 214b, which protrudes from the second closure 218b without being covered by any plastic, has been inserted into hinge pin slot 72b of second ear 208b. The opposite end of second hinge pin 214b, which also protrudes from second closure 218b without being covered by any plastic, is inserted into a corresponding hinge pin slot of bottom cup ear 208a. In the preferred embodiment of the present invention, it is anticipated that there will be a total of four ears on bottom cup 226, with two ears being arranged symmetrically on each side of the cup. The two exposed ends of first hinge pin 214a and the two exposed ends of the second hinge pin 214b will each have a hinge pin slot into which they can be inserted.

The fourth important step in manufacturing the above-described preferred embodiment of the present invention is to cool the molded plastic components to set their shape and to control the tendency of the plastic to shrink. Generally speaking, and referring to FIG. 19, this is accomplished by mounting the molded cup on a holder assembly 238, which includes a closure holding assembly 236, and inner holder 240 and an outer holder 250. When the torroid-forming surfaces of the cup include spaced ridges, the holder assembly further includes a sleeve adapter 241 that slides over the inner holder 240.

Figure 20:
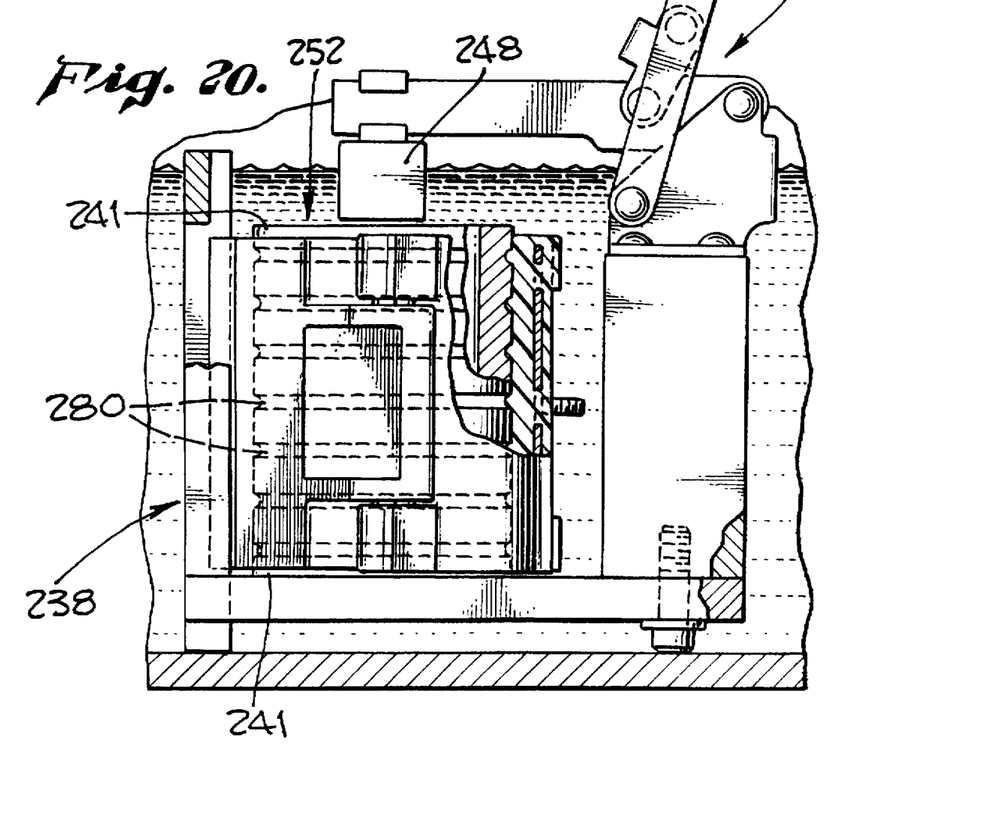
FIG. 20 is a side view and partial sectional view of a warm molded forming cup and holder immersed in a cold liquid bath.
Figure 21:
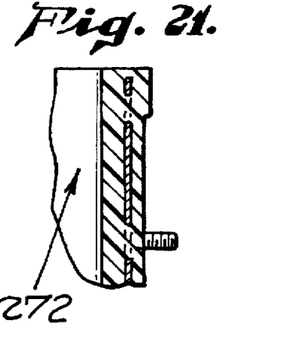

Inner holder 240 is typically made of metal and has a hollow cylindrical shape. This cylindrical shape corresponds to the substantially cylindrical profile of the complete torroid forming surface of the fully assembled torroid forming cup, such as the profile shown in FIG. 4. The outer surface of the inner holder 240 is generally smooth, and forming cups with smooth or striated forming surfaces are directly mounted onto the inner holder 240. Forming cups having spaced ridges are first mounted on a sleeve adapter 241 that has channels 280 (FIG. 20) to correspond to the location of the ridges. The channels 280 allow the shape of the ridges to set without the ridges getting flattened, as would happen if the ridges were tightly pressed against a flat surface.

Figures 19, 21:
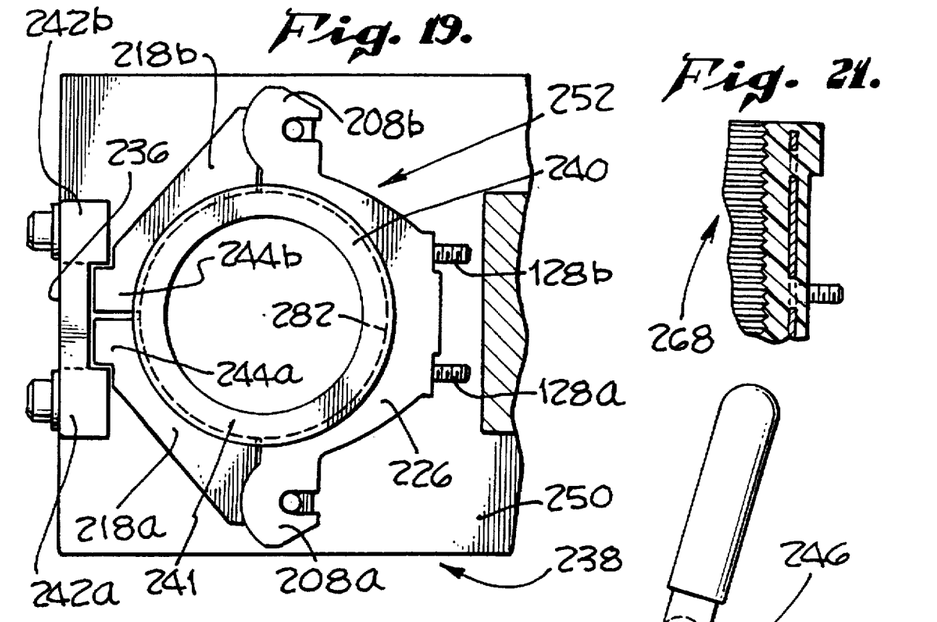
FIG. 19 is a top view of a molded forming cup which is mounted on a holder prior to immersion in a cold liquid bath.
FIG. 21 is a detail view of an inner dough forming surface having fine annular striations.

FIG. 19 shows the fully assembled forming cup 252 in place about a sleeve adapter 241, which is itself mounted over an inner holder 240. The spaced annular retaining ridges may be seen as broken lines 282 in FIGS. 14, 15 and 19. The corresponding spaced annular channels in the sleeve adapter 241 can be seen more clearly in FIG. 20.

It should be noted that the inner holder 240 (for cups with smooth or striated forming surfaces) or the sleeve adapter 241 (for cups with spaced ridges on the forming surfaces) fit snugly within the interior of the fully assembled forming cup 252 during cooling so as to retain the substantially cylindrical interior profile of forming cup 252. This snug fit is maintained by locking first and second closures 218a and 218b in a closed position as shown in FIG. 19. First closure bar 242a and second closure bar 242b abut plastic tabs 94a and 94b, respectively, thereby maintaining the first and second closures in a closed position about the inner holder 240. A toggle mechanism 246 is operated to lower a horizontal block 248 to abut the upper surface of the torroid forming cup, thereby maintaining the cup 252 in place vertically. In the lowered position, the lower surface of the horizontal block 250 is flat against the upper surface of the cup 252.

With the forming cup 252 thus mounted onto holder assembly 238, the cup 252 and holder assembly 238 are then immersed in a chilled water bath 258. This chilled water bath should have a temperature just slightly above the freezing point, or at about 32 degrees Fahrenheit. The warm plastic assembly cup 252 should remain in the chilled water bath 258 for several minutes, or at least until the plastic has cooled to room temperature. At this point, the generally cylindrical interior torroid forming surface of the forming cup 252 will have set and the end portions of the first and second hinge pins 214b and 219b (FIG. 14) will be elastically retained within the retaining slots of the bottom cup section ears.

Figure 22:
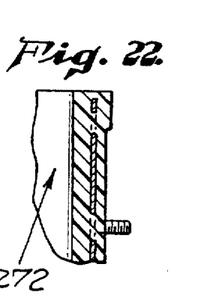
FIG. 22 is a detail view of an inner dough forming surface which is smooth.

It should be noted that the generally cylindrical interior torroid forming surfaces of forming cup 252 do not necessarily need to have spaced annular ridges 282. Instead, the surface may have fine annular striations 268, such as those shown in FIG. 21, or may be smooth, as shown in FIG. 22.

It is noted that not all torroid cups have the same inner diameter. A torroid-forming cup for a small bagel will have a smaller inner diameter, while a torroid forming cup for a large bagel will have a larger inner diameter. Consequently, a variety of interchangeable inner holders 240 and/or sleeve adapters 241 may be provided to have outer diameters to match the inner diameter of the particular torroid forming cup. These inner holders and/or sleeve adapters mount onto the holder assembly 238 to maintain the shape of the torroid forming surfaces of the cup as the cup cools. The inner holders 240 and/or sleeve adapters 241 may have various features to match corresponding features on the torroid forming surface of the cup, such as indentations, raised portions and so on.

In conclusion, it is to be understood that the foregoing detailed description and the accompanying drawings relate to preferred embodiments of the invention. Various changes and modifications may be made without departing from the spirit and scope of the invention. Thus, by way of example and not of limitation, the reinforcing subframe need not be made of metal, but may be made of a similarly rigid composite material. The forming cup may be connected to a link chain or conveyer belt by an affixing member other than studs. The hinge pins need not be made of metal, but may alternatively be made from a composite or other material. The closures may be hinged to the reinforced bottom cup section with any of a number of hinging arrangements that do not necessarily require a hinge pin or hinge pin slot. The reinforcing structure and studs are preferably made of steel, but may alternatively be made from other rigid, durable metals, such as brass.

Although the hinge retaining slots in the bottom cup portion are preferably substantially parallel, the slots may alternatively be slightly tapered, such that the entrance to the slot is normally narrower than the diameter of the corresponding hinge pin, in order to retain the hinge pin in the slot. As yet another alternative, the torroid forming cup may also be entirely made of plastic, with no reinforcing structure.

Accordingly, the present invention is not limited to the specific embodiment shown in the drawings and described in the detailed description.

What is claimed is:

1. A reinforced, molded plastic forming cup for an automated dough-forming apparatus, the cup having a surface that is durable in a commercial dough forming environment and which does not require a non-stick coating to prevent dough from adhering to the surface, comprising:

two molded hard plastic upper closures, each including a metal hinge pin and an upper non-stick dough torroid forming surface having a substantially quarter-cylindrical profile and a plurality of spaced, molded dough-retaining ridges; and a bottom reinforced cup section comprising a substantially rigid interior subframe and a hard plastic outer body portion that is molded about said subframe, said plastic outer body portion including a bottom non-stick dough torroid forming surface with a semi-cylindrical profile and a plurality of spaced ridges, said metal subframe providing structural stiffness to said reinforced cup section;

wherein said reinforced cup section includes plastic hinge slots into which said hinge pins are rotatably mounted so that said closures may be rotated from an open position for depositing dough inside the forming cup to a closed position in which said upper dough torroid forming surfaces and said bottom dough torroid forming surface are adjacent to one another to make a substantially fully cylindrical torroid forming surface.

2. A forming cup as defined in claim 1 wherein said subframe includes at least one stud which protrudes through said outer body portion for affixing the forming cup to a conveyer.

3. A forming cup as defined in claim 1, wherein each of said slots includes a retaining button to retain a hinge pin within the slot.

4. A forming cup as defined in claim 1, wherein said metallic subframe includes casting perforations to firmly embed said subframe into said outer plastic body portion to prevent delamination of said outer plastic body portion from said subframe.

5. A forming cup as defined in claim 1, wherein said subframe has a generally concave profile.

6. A reinforced, molded plastic forming cup for an automated dough torroid-forming apparatus, the cup having a forming surface that is durable in a commercial dough forming environment and which does not require a non-stick coating to prevent dough from sticking to the surface, comprising:

two molded plastic upper closures, each including a hinge pin and an upper dough torroid forming surface; and a reinforced bottom cup base comprising a rigid interior subframe and a molded plastic outer body portion, said outer body portion including a bottom dough torroid forming surface, said subframe providing structural stiffness and durability to said reinforced bottom cup section;

wherein said reinforced bottom cup section includes hinge pin retaining slots into which said hinge pins are rotatably mounted so that said upper closures may be rotated from an open position for depositing dough inside the forming cup into a closed position in which said upper dough torroid forming surfaces and said bottom dough torroid forming surface are adjacent to one another to make a substantially fully cylindrical dough torroid forming surface.

7. A forming cup as defined in claim 6 wherein said subframe includes a stud which protrudes through said outer body portion for affixing the forming cup to a conveyer.

8. A forming cup as defined in claim 6, wherein each of said slots includes a retaining button to retain a hinge pin within the slot.

9. A forming cup as defined in claim 6, wherein said subframe includes casting apertures to prevent delamination of said plastic body portion from said subframe.

10. A forming cup as defined in claim 6, wherein said dough torroid forming surfaces include a plurality of spaced ridges for retaining dough in the forming cup during dough torroid forming.

11. A forming cup as defined in claim 6, wherein said dough torroid forming surfaces include a plurality of annular striations for retaining dough in the forming cup during dough torroid forming.

12. A forming cup as defined in claim 6 wherein said dough torroid forming surfaces are substantially smooth.

13. A reinforced, molded plastic forming cup for an automated dough torroid-forming apparatus, the cup having a forming surface that is durable in a commercial dough forming environment and which does not require a non-stick coating to prevent dough from adhering to the surface, comprising:

at least one molded plastic closure having a durable first molded non-stick partial torroid forming surface; and a reinforced cup section comprising a substantially rigid subframe and a molded plastic body portion that is in contact with said subframe, said plastic body portion including a durable second molded non-stick partial torroid forming surface, said subframe providing structural stiffness to said reinforced cup section;

said at least one closure being hingedly mounted to said reinforced cup section;

wherein said at least one closure may be rotated from an open position for depositing dough inside the forming cup to a closed position in which said first partial torroid forming surface and said second partial torroid forming surface are closed together to form a complete torroid forming surface, and wherein said molded plastic forming surface is free of any additional non-stick coating that is subject to wear after repeated forming of dough torroids.

14. A composite forming cup as defined in claim 13, wherein said subframe is within said molded plastic body.

15. A composite forming cup as defined in claim 13, wherein said subframe is outside said molded plastic body.

16. A composite forming cup as defined in claim 13, wherein forming cup comprises two closures, each of said closures being independently hingedly mounted onto said reinforced cup section.

17. A composite forming cup as defined in claim 13, wherein said at least one closure includes a metal hinge pin hingedly mounted onto said reinforced cup section.

18. A composite forming cup as defined in claim 13, wherein said subframe has at least one mounting stud for mounting the forming cup to another portion of the automated torroid forming machine.

19. A composite forming cup as defined in claim 13, wherein said reinforced cup section has at least one female threaded member for mounting the forming cup to another portion of the automated torroid forming machine.

20. A composite forming cup as defined in claim 13, wherein said subframe is made of metal.

21. A composite forming cup as defined in claim 20, wherein said metal subframe has a roughened surface.

22. A composite forming cup as defined in claim 13, wherein said subframe is molded into the plastic body portion, and wherein said subframe includes a plurality of casting perforations to prevent the subframe from moving relative to the plastic body.

* * * * *

UNITED STATES PATENT AND TRADEMARK OFFICE
CERTIFICATE OF CORRECTION

PATENT NO. : 5,707,661
DATED : January 13, 1998
INVENTOR(S) : Stephen M. Thompson It is certified that error appears in the above-identified patent and that said Letters Patent is hereby corrected as shown below:

On the title page: Item [56] Reference Cited:

In the "Reference Cited" on the first page of the Patent, the following U.S. Patent Documents should also be listed:

| | | |
|---|---|---|
| 4,147,809 | 4/1979 | Thompson.............426/499 |
| 4,368,019 | 1/1993 | Thompson.............425/141 |
| 4,478,565 | 10/1984 | Thompson.............425/141 |
| RE 25,536 | 3/1964 | Thompson.............107/8 |
| 3,031,979 | 5/1962 | Thompson.............107/8 |
| 4,799,875 | 1/1989 | Thompson.............425/329 |
| 3,379,142 | 4/1968 | Reiter et al...........107/8 |

In the drawings, sheet 1, figure now labelled as Fig. 21 should be labelled Fig. 22 as shown on the attached sheet.

Signed and Sealed this

Twenty-first Day of April, 1998

Attest:

BRUCE LEHMAN

Attesting Officer

Commissioner of Patents and Trademarks